United States Patent [19]

Clampitt

[11] Patent Number: 5,681,535
[45] Date of Patent: Oct. 28, 1997

[54] CRACKING OF FEEDSTOCKS

[75] Inventor: Roy Clampitt, Oxford, England

[73] Assignee: Oxford Applied Research Limited, England

[21] Appl. No.: 499,342

[22] Filed: Jul. 7, 1995

[30] Foreign Application Priority Data

Jul. 16, 1994 [GB] United Kingdom ............ 9414415

[51] Int. Cl.$^6$ ........................................ F27B 15/08
[52] U.S. Cl. ............... 422/144; 422/198; 422/312; 208/106; 208/132
[58] Field of Search ........................ 422/129, 187, 422/198, 244, 307, 312, 144, 145, 146; 208/46, 59, 106, 132

[56] References Cited

U.S. PATENT DOCUMENTS

| 5,080,870 | 1/1992 | Streetman et al. | 422/129 |
| 5,156,815 | 10/1992 | Streetman et al. | 422/129 |
| 5,298,759 | 3/1994 | Brewer et al. | 250/492.1 |

FOREIGN PATENT DOCUMENTS

| 298599 | 12/1928 | United Kingdom. |
| 334926 | 9/1930 | United Kingdom. |
| 366494 | 1/1932 | United Kingdom. |
| 403647 | 12/1933 | United Kingdom. |
| 422273 | 1/1935 | United Kingdom. |
| 1193968 | 6/1970 | United Kingdom. |
| 2066696 | 7/1981 | United Kingdom. |

*Primary Examiner*—Christopher Kim
*Attorney, Agent, or Firm*—M. LuKacher, Esq.

[57] ABSTRACT

Cracker apparatus has a feedstock vessel for gaseous crackable substances, a dispenser which receives the gaseous crackable substances from the feedstock vessel and a cracker which receives the gaseous crackable substances from the dispenser. The vessel surfaces, dispenser surfaces and cracker surfaces that contact the gaseous crackable substances are suitably inert and can be made of quartz.

13 Claims, 9 Drawing Sheets

STOPPER

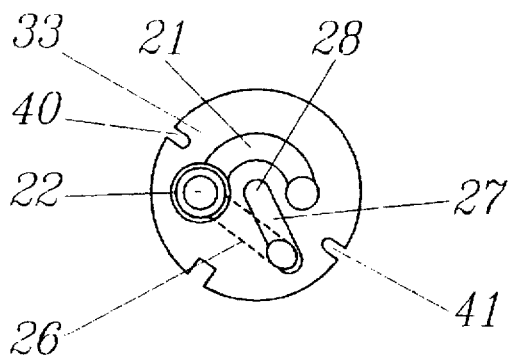
Fig. 7
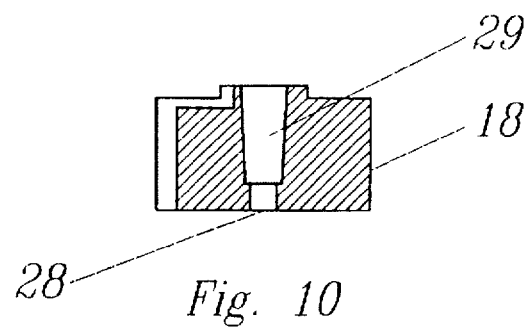
Fig. 10
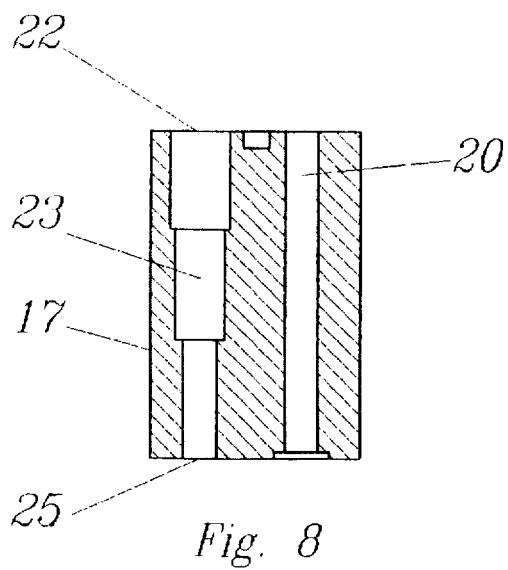
Fig. 8
Fig. 9
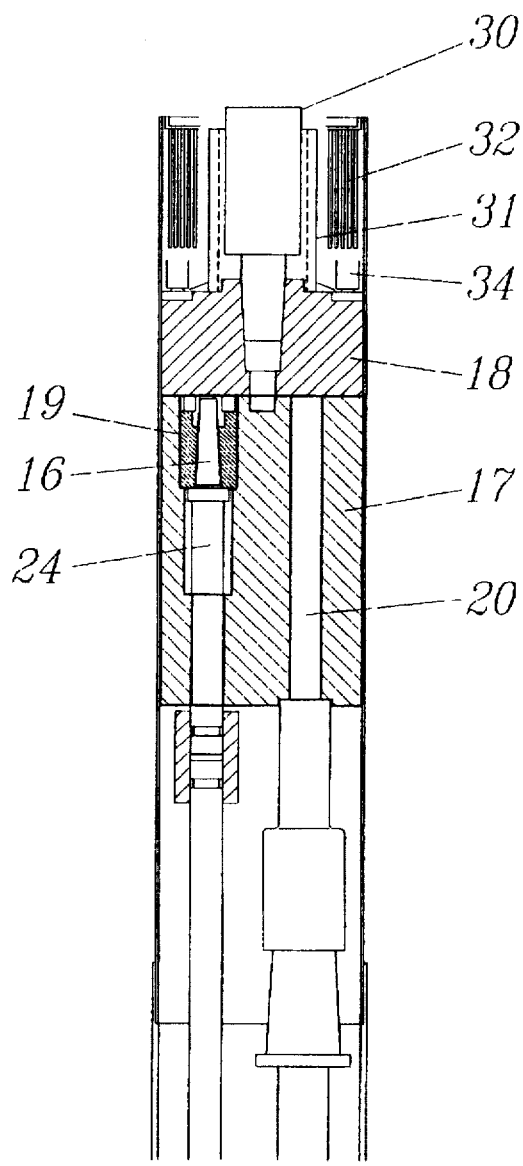
Fig. 11

CRACKING OF FEEDSTOCKS

Cracking processes may dissociate substance(s) to provide dissociation product(s). Some examples of dissociatable inorganic substances are arsenic, phophorus, and sulphur. A cracking process may subject at least one gaseous feedstock to thermal cracking and/or electrical cracking conditions so as to provide at least one dissociation product. For example, gaseous $P_4$ may be thermally cracked to give $P_2$, or gaseous $P_4$ may be electrically cracked to give $P_2$ and/or $P_1$. The term "gaseous" refers to at least one phase comprising gas and/or vapour of a crackable feedstock. Feedstock(s) may be inorganic and/or organic.

A first aspect of the present invention provides cracker apparatus, comprising:
- a feedstock vessel for providing gaseous crackable substance(s), the vessel surface(s) that will contact said gaseous crackable substance(s) being suitably inert and optionally at least partly comprising quartz and or any other suitable material(s);
- dispenser means for receiving said gaseous crackable substance(s) from said feedstock vessel, the dispenser means surface(s) that will contact said gaseous crackable substance(s) being suitably inert and optionally at least partly comprising quartz and/or other suitably inert material; and
- cracker means for receiving dispensed gaseous crackable substance(s) from said dispenser means, the cracker means surface(s) that will contact said dispensed gaseous crackable substance(s) being suitably inert and optionally at least partly comprising quartz and/or other suitably inert material.

A second aspect of the invention provides a cracker process, comprising utilising at least one cracker apparatus of the first aspect of the invention, so as to give at least one dissociation product.

A third aspect of the invention provides a said feedstock vessel.

A fourth aspect of the invention provides a said dispenser means.

A fifth aspect of the invention provides a said cracker means.

A sixth aspect of the invention provides at least one dissociation product given by the first aspect or second aspect of the invention.

The invention may be embodied and utilised in any suitable manners. The dissociation product(s) may be utilised in any suitable manners, e.g. in synthesis of thin film substances, for instance for making integrated circuits or opto-electronic devices.

In carrying out the present invention, any of said suitably inert surfaces may be provided in any suitable manners and from any suitably inert materials. Those materials are preferably of sufficent purity such as to prevent or reduce risk of any contaminant(s), or undesirable contaminant(s), therein from contaminating crackable substances and/or dissociation products, especially at temperatures encounted in said cracker means. No restriction is placed on the composition of any suitably inert materials other than suitability for use in the present invention. Some examples of suitably inert materials may be selected from quartz, pyrolytic boron nitride, molybdenum, tantalum, tungsten, graphite, etc.

Thus, it will be appreciated that in carrying out the present invention, suitably inert surfaces will overcome or reduce problems of chemical attack if e.g. metal surface(s) were to be contacted with the gaseous crackable substance(s) and/or dissociation products, especially when at temperatures encountered in cracking processes.

Said suitably inert vessel surface(s) may at least partly comprise said quartz when that material is suitable. One example of preferred suitably inert quartz for providing a quartz feedstock vessel or quartz pipework is HERAEUS HSQ400. One example of preferred suitably inert quartz for providing a quartz dispensing valve is Corning Code 7940 (which may alternatively be referred to as fused silica). The term "quartz" used herein also includes the terms "fused silica" and "quartz glass". Any said quartz is preferably at least 99.9999%$SIO_2$.

Said cracker apparatus may comprise an air-tight housing for said feedstock vessel, the outer surface of said housing preferably being water-cooled.

Said cracker apparatus may comprise pipework for detachably coupling said feedstock vessel to said dispenser means, said feedstock vessel being detachably coupled to said pipework by means of a ball-and-socket joint, and said pipework being detachably coupled to said dispenser means by means of a cone-and-socket joint, the surfaces of said pipework and of said joints that will contact said gaseous crackable substance(s) being suitably inert and at least partly comprising said quartz. Said pipework may comprise a sump zone, the surface(s) of said sump zone that will contact said gaseous crackable substance(s) being suitably inert and at least partly comprising said quartz.

Said cracker apparatus may comprise transducer means for actuating said dispenser means. Said transducer means may comprise micrometer linear transducer means. Said transducer means may comprise a computer controlled transducer that will be operated in accordance with a computer program.

Said dispenser means may comprise a dispenser valve comprising a tapered valve stem and a taper-matched valve seat within which is intimately fitted said valve stem, the surface(s) of said valve stem and said valve seat that will contact said gaseous crackable substance(s) being suitably inert and at least partly comprising said quartz. Said valve stem may be actuated by means of a connecting shaft connected by means of a spring to a said transducer, said spring controlling the maximum closing force that can be applied to said valve stem. Said dispenser valve may comprise a valve base and a valve top, said valve base comprising a channel for receiving gaseous crackable substance(s) from said pipework, which then pass(es) across an arcuate channel in the upper face of said valve base and the co-joined face of said valve top, said arcuate channel terminating over a hole in said valve seat, gaseous crackable substance(s) being able to flow from said arcuate channel into a longitudinal cavity in said valve base, and thence via a diagonal channel to a longitudinal channel in the upper face of said valve base and the co-joined face of said valve top, said longitudinal channel being connected to an axially located channel in said valve top, which allows passage of said gaseous crackable substance(s) into said cracker means, the surface(s) of said valve base and of said valve top that will contact said gaseous crackable substance(s) being suitably inert and at least partly comprising said quartz. Said axially located channel of said dispenser valve may be tapered to accept a conical base of a cracker pot.

Said cracker means may be detachably coupled to said dispenser means by means of a suitable (e.g. quartz) cone-and-socket joint. Said cracker means may be adapted for providing thermal cracking. Said cracker means may be adapted for providing electrical cracking. Said suitably inert cracker means surface(s) may be suitably selected from said quartz pyrolytic boron nitride, molybdenum, tantalum, tungsten, graphite, etc.

Said cracker apparatus may comprise a process chamber for receiving cracker substance(s) from said cracker means.

Said cracker apparatus may comprise at least one heater means for heating at least one portion of said cracker apparatus.

The dispenser means may comprise any suitable dispenser valve means controlling dispensing provided by said dispenser means. Quartz dispenser valve means may comprise a suitable quartz valve stem regulatable by an external spring loaded shaft for controlling force (e.g. maximum force) that can be applied to the valve stem, said shaft optionally providing relief from lateral stress (if present) on the valve stem.

Upstream of said valve means, said pipework may comprise a sump zone which facilitates minimisation of pressure fluctuations, during dispensing, between the upstream region of said valve means and the feedstock vessel.

Components of the cracker apparatus of the invention may be coupled together in any suitable manners, e.g. by detachable coupling utilising quartz cone-and-socket joint(s) and/or detachable coupling utilising quartz ball-and-socket-joint(s). Quartz surfaces to be coupled together should be self sealing, e.g. they may be suitably ground and polished surfaces. Preferably, the quartz is at least 99.9999% $SiO_2$.

The feedstock vessel may be embodied in any suitable manners. For example, the feedstock vessel may be a heatable vessel for converting feedstock source(s) into gaseous feedstock(s) by heating those source(s), for instance by heating $P_4$. Some examples of said vessel are: bottles or other chambers; or conduit means (e.g. pipework) constituting at least one said vessel. Conduit means may commmunicate with an optional separate source of gaseous feedstock(s).

Preferably, the dispenser valve is located sufficiently near to the cracker means (e.g. a cracker pot as described below with reference to the accompanying drawings) so as to ensure rapidity of onset or cessation of dispensing.

Before using the cracker apparatus, the cracker apparatus may by suitably evacuated in any suitable manners. For example, evacuation may be via a vacuum sealing flange (e.g. as described below with reference to the accompanying drawings) attached to a process chamber.

BRIEF DESCRIPTION OF THE DRAWINGS

In the accompanying drawings, which are by way of example of the present invention:

FIGS. 7 to 11 shows further details of the valve corresponding to FIG. 6, FIG. 11 also showing one embodiment of a cracker assembly containing a cracker pot.

Figure 1:
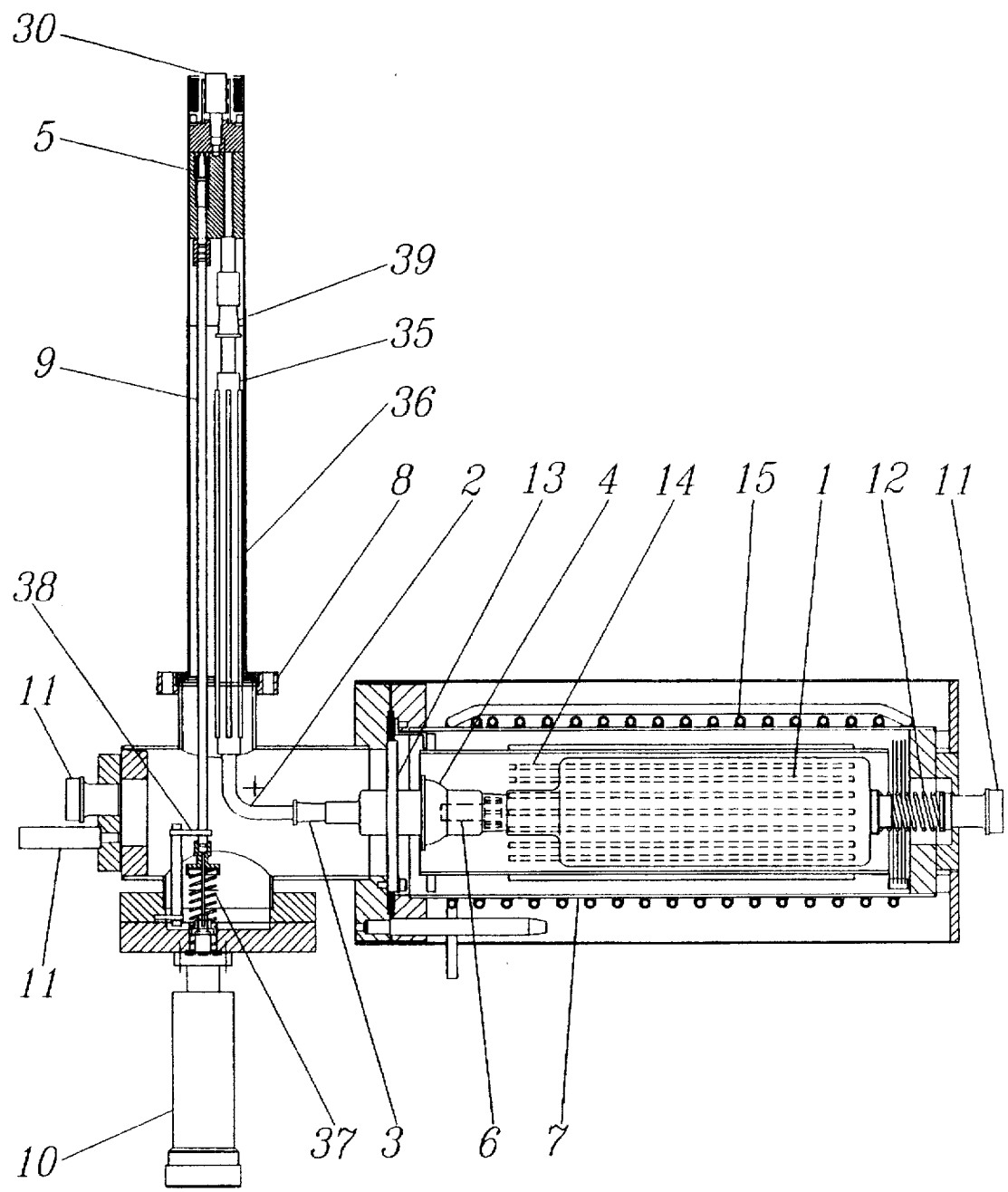
FIG. 1 shows one embodiment of a cracker apparatus of the invention.
Figure 2:
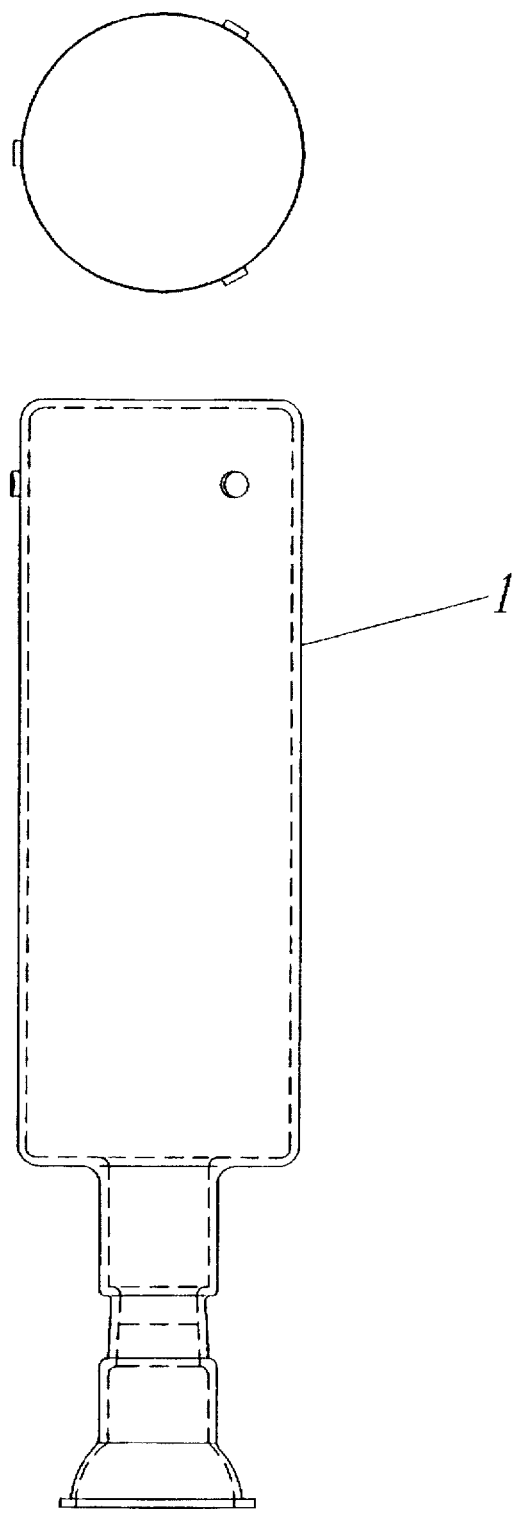
FIG. 2 shows one embodiment of a feedstock vessel of the invention.
Figure 3:
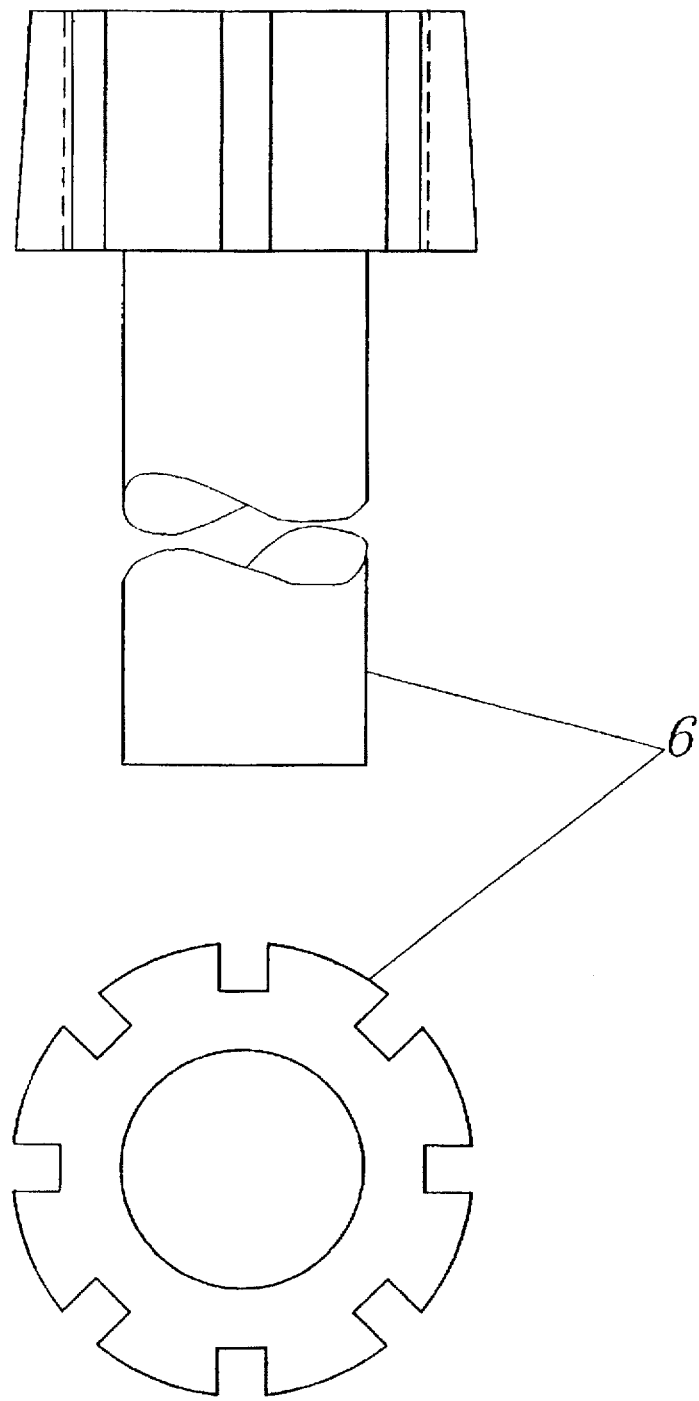
FIG. 3 shows one embodiment of a slotted stopper insert for the neck of the feedstock vessel of FIG. 2.
Figure 4:
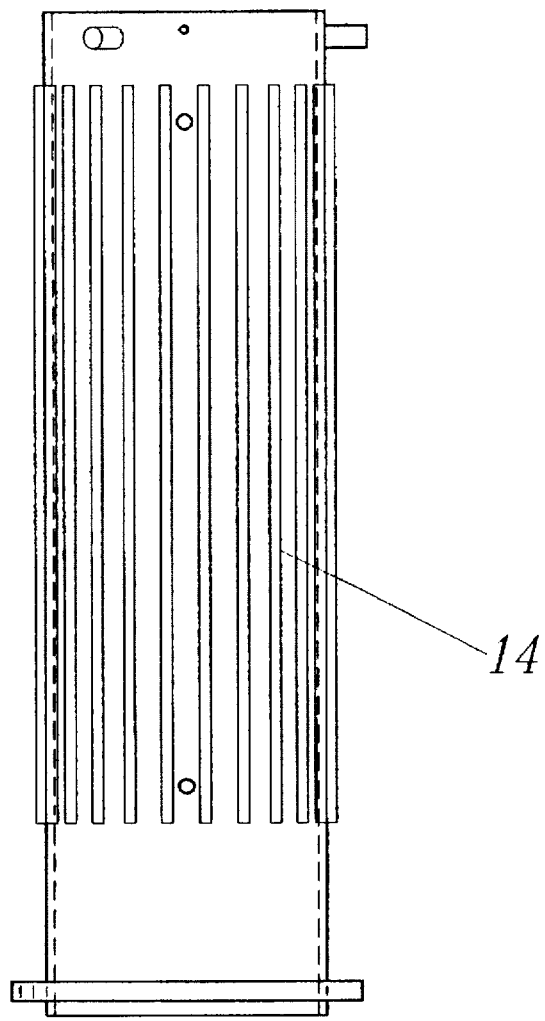
FIG. 4 shows one embodiment of a quartz sleeve surrounding the feedstock vessel of FIG. 2, the sleeve acting as a former for heater elements.
Figure 4:
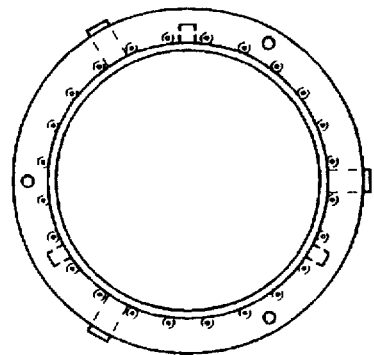
Figure 5:
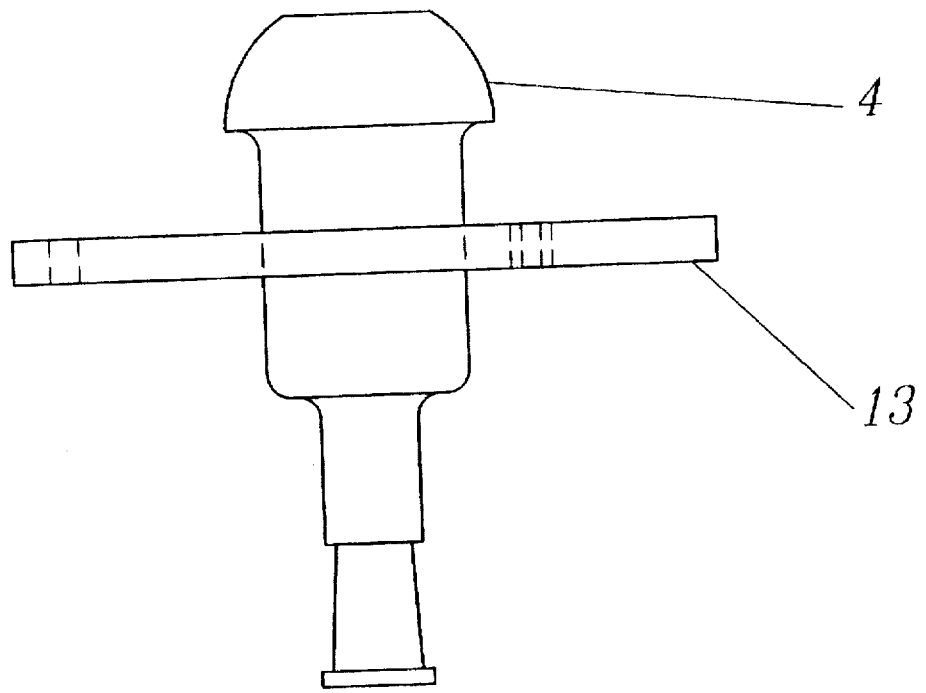
FIG. 5 shows one embodiment of a quartz ball-and-socket joint and quartz anchoring disc.
Figure 5:
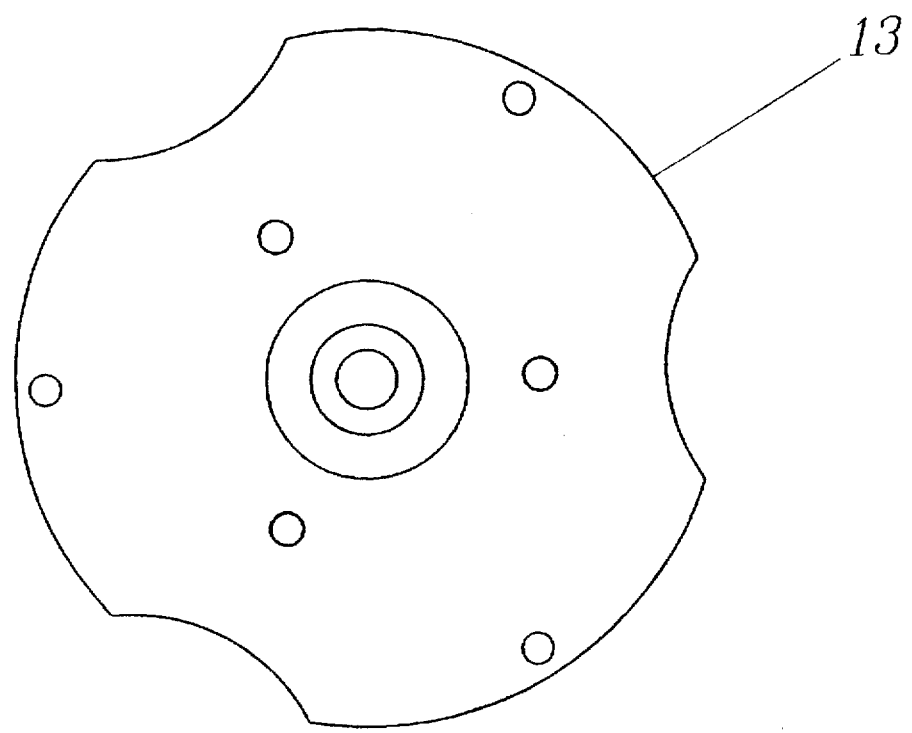
Figure 6:
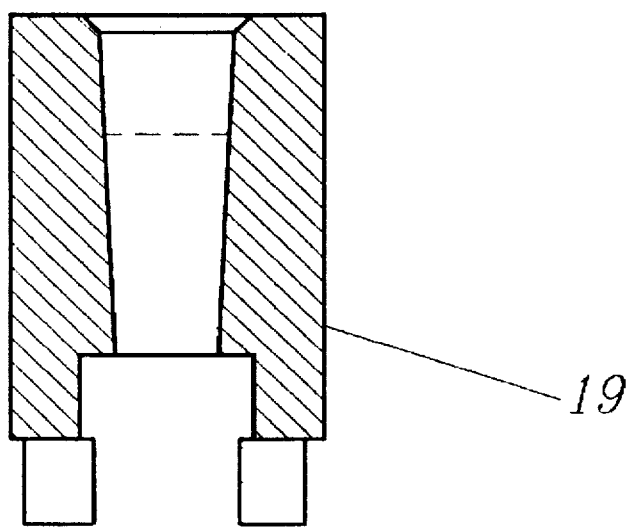
FIG. 6 shows one embodiment of a removable valve seat.
Figure 6:
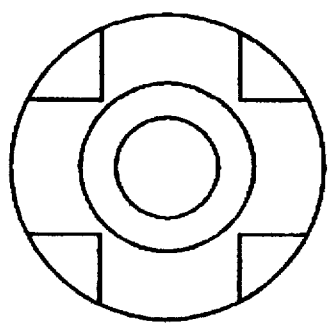
Figure 12:
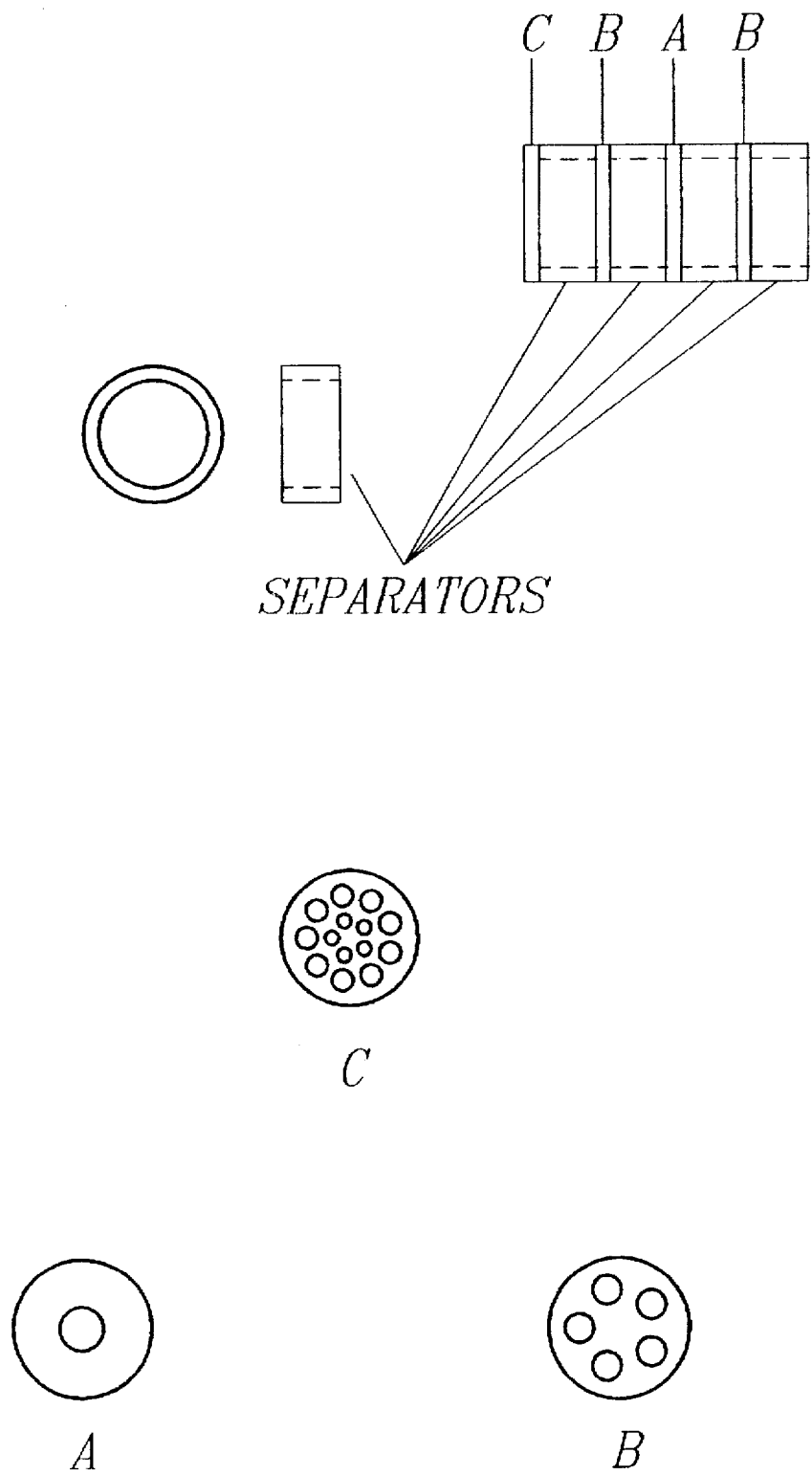
FIG. 12 shows some embodiments of perforated quartz discs within the cracker pot of FIG. 11.
Figure 13:
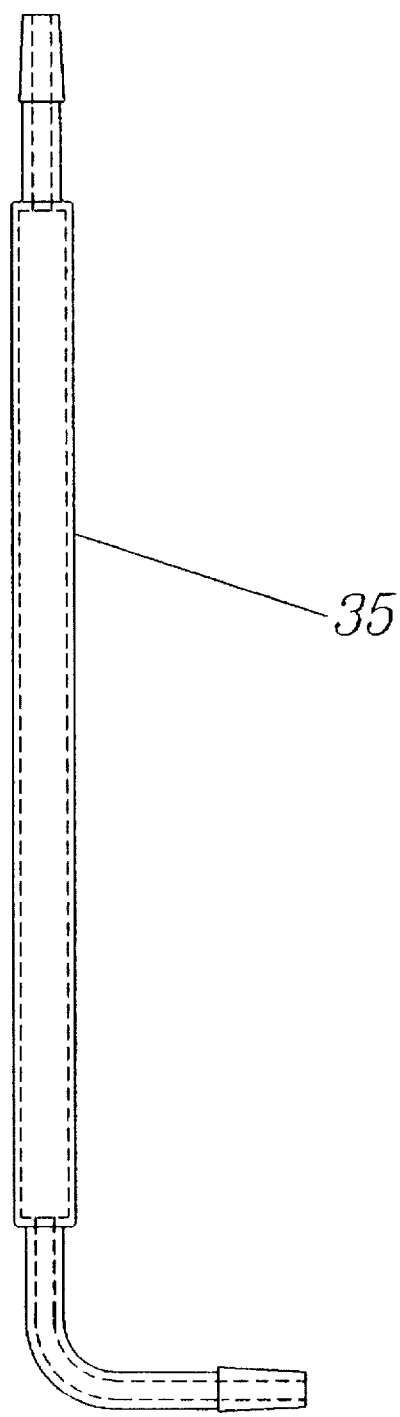
FIG. 13 shows one embodiment of a sump zone of pipework.

Referring to the drawings, and especially to FIG. 1, a quartz feedstock vessel 1 (e.g. of HERAEUS HSQ400) of generally cylindrical configuration is detachably coupled to quartz pipework 2 (e.g. of HERAEUS HSQ400) by means of detachable coupling utilising quartz cone-and-socket joint 3 and quartz ball-and-socket joint 4. Pipework 2 is detachably coupled to quartz valve 5 (e.g. of Corning Code 7940) which is detachably coupled to quartz cracker pot 30, as described below.

Cone-and-socket joint 3 and ball-and-socket joint 4 are sufficiently gas tight for transmitting a flux of heated gaseous feedstock from vessel 1 via pipework 2 and valve 5 into cracker pot 30 wherein cracking occurs to provide dissociation products, e.g. suitable for thin film substances. The joints 3,4 are not sufficiently leak-tight to prevent atmospheric air from passing through them into vessel 1, pipework 2, dispenser valve 5, and cracker pot 30, consequently, vessel 1 and its coupled portion of pipework 2 are encased in an air-tight stainless steel housing 7 up to vacuum sealing flange 8 (of a known kind) detachably or permanently coupled to housing 7. Flange 8 may be used to evacuate the cracker apparatus.

Feedstock vessel 1 is spring-loaded 12 onto pipework 2 by means of ball-and-socket joint 4 which, on connection and disconnection, permits more "forgiving" lateral movement in the event of its misalignment with respect to the ball-and-socket joint 4 than does a cone-and-socket joint. Ball-and-socket joint 4 is affixed rigidly to the surrounding steel housing 7 by means of a suitable quartz disc 13, flame-torched onto it, so as to minimise stress on pipework 2, particularly during connection or disconnection of vessel 1. Vessel 1 can be heated by means of standard refractory metal heating elements 14. The outer surface of housing 7 is water-cooled 7A. Vessel 1 may contain solid red phosphorus $P_4$ to be converted into gaseous $P_4$ by means of utilising the heating elements 14. Any suitable pressure conditions (e.g. 0.1 torr) may exist in vessel 1 before, during or after the heating.

Sump zone 35 of pipework 2 leading to dispenser valve 5 is enlarged in diameter over the principal length of that zone. Sump zone 35 functions, by virtue of its capacity, as a gas pressure surge reducing reservoir, which minimises, when valve 5 is operated, pressure differences between feedstock vessel 1 and pipework 2 in the upstream region of valve 5. Sump zone 35 can be heated independently of vessel 1, by means of standard refractory metal heating elements 36, which facility can be used to advantage in stabilising in the sump zone 35 the gas pressure of the gaseous crackable substance(s), especially those that exhibit temperature-dependent allotropic transformations, e.g. phosphorus. Sump zone 35 is detachably connected to base 17 of valve 5 by means of a quartz cone-and-socket joint 39.

Quartz dispenser valve 5 is actuated externally of housing 7 by means of a connecting shaft 9 utilising a flexible spring connector 37 (see later below), connected to an external and commercially available linear transducer 10 (e.g. of a micrometer kind) fitted with an air-tight bellows mechanism (not shown). Air-tight connectors 11 provide power for the heating elements and also temperature-measuring thermocouples.

Dispenser valve 5 comprises three quartz components: valve plunger or stem 16; valve base 17; and valve top 18. Those components may made of Corning Code 7940. Valve stem 16 is tapered and fits intimately into a taper-matched quartz seat 19. Dimensions of stem 16 and seat 19 were calculated theoretically and verified experimentally to provide a controllable and near-linear conductance in e.g. the preferred conductance range of substantially 0.5 to substantially 50.0 milliliters sec$^{-1}$ at a typical sump pressure of 0.1 torr, which can be achieved with the valve dimensions: upstream seat hole diameter 4 mm; seat and taper angle 5°; and seat orifice length 10 mm. Valve stem 16 and its connecting shaft 9 are connected to transducer 10 by spring 37 which controls the maximum closing force that can be applied to valve stem 16. Spring 37 also ensures no lateral load is applied to shaft 9 and stem 16, which are aligned with valve seat 19 by means of adjustable guide bearing 38.

Gaseous feedstock from pipework 2 passes through channel 20 in valve base 17 of dispenser valve 5, and across an arcuate channel 21 in the upper face 33 of valve base 17 and the co-joined face of valve top 18 of valve 5. Arcuate channel 21 terminates over hole 22 in valve seat 19 of valve 5. When valve 5 is opened, gaseous feedstock flows through it into cavity 23 which houses quartz shaft 24 of valve stem 16, and constitutes the first portion of the downstream zone of valve 5, i.e. that zone in which the pressure of gaseous feedstock is substantially lower than that in the upstream sump zone 35 of pipework 2. Shaft 24 is close-fitted within longitudinal channel 25 in valve base 17, within which it slides during actuation of valve 5. Because shaft 24 operates in the downstream low-pressure zone of valve 5, and since shaft 24 is a close fit within channel 25, leakage of gaseous feedstock along the gap between the outer surface of shaft 24 and the surface of channel 25 is minimised. Gaseous feedstock flows from channel 21 into longitudinal cavity 23 in valve base 17, and thence via a diagonal channel 26 to a longitudinal channel 27 in the upper face of valve base 17 and the co-joined face of valve top 18 of valve 5. Channel 27 connects to an axially located channel 28 in valve top 18, which allows passage of gaseous feedstock into cracker pot 30.

Axially located channel 28 is tapered 29 to couple detachably with the conical base 30A of cracker pot 30. Tapered channel 29 and conical base 30A thereby constitute a cone-and-socket joint. A succession of any suitable number (e.g. 4) of perforated quartz discs CBAB is housed in cracker pot 30, so as to provide a plurality of collision surfaces for the incoming gaseous feedstock, to help thermalise the gaseous feedstock to the cracker pot temperature (e.g. 1000° C.), thereby maximising the efficiency of thermal dissociation (i.e. thermal cracking) of the gaseous feedstock prior to its passage after cracker pot 30 into a process chamber (not shown), e.g. a synthesis chamber for making integrated circuits or opto-electronic devices. In the case of thermal cracking, cracker pot 30 is heated radiatively by means of a refractory metal heating element 31 surrounding cracker pot 30. This element may be surrounded by radiation shields 32. The temperature of the cracker pot may be measured e.g. by means of a tungsten-rhenium thermocouple (not shown). The cone-and-socket assembly of the cracker pot permits its easy removal or replacement. Electrical cracking may be provided, e.g. by surrounding the cracker pot with a radio-frequency induction coil, which when energised will generate an electrical discharge in the gaseous feedstock within the cracker pot.

All surfaces of valve stem 16, valve base 17, and valve top 18 which come into contact with the gaseous feedstock must, when co-joined, be made gas-tight. This may be achieved by precision grinding and polishing of the quartz surfaces to a tolerance of ±2 microns, excepting the co-joined quartz faces of valve base 17,33 and valve top 18,40 which have a surface flatness of λ. These two latter surfaces may be co-joined by optical contacting in a particulate-free room. The assembled dispenser valve 5 is additionally secured by means of two tantalum bolts 34 which pass through two radially diametric channels 40,41 in the valve base and the valve top. In the case of thermal cracking, these bolts serve also as current-carrying leads for the heating element 31 surrounding cracker pot 30. In the case of electrical cracking, the bolts 34 serve also as the current/voltage-carrying leads for a radio-frequency induction coil (not shown) that may surround the cracker pot 30.

It will be appreciated that dispenser valve 5 may be operated in any suitable manners, e.g. be open or closed, or be adjustably open or adjustably closed. Valve 5 may provide rapid and reproducible onset and cessation of gaseous feedstock. It will also be appreciated that the above cracker apparatus (by utilising sump zone 35 and valve 5) will minimise gaseous pressure surges during operation of valve 5.

Linear transducer 10 may be manually operated in any suitable manners. An alternative to transducer 10 may be a computer controlled transducer operated in accordance with a computer program. It is possible to operate transducer 10 (or any other suitable transducer) so as to provide a profile of gaseous feedstock(s) from dispenser valve 5.

It should be noted that dispenser valve 5 is preferably sufficiently near to the cracker pot 30 so as to ensure rapidity of onset or cessation of dispensing by means of valve 5. The rapidity may be appropriate to providing a profile of gaseous feedstock from valve 5.

Feedstock vessel 1 is a heatable vessel for providing gaseous feedstock by heating e.g. solid feedstock, for instance $P_4$. However, vessel 1 may be replaced by any suitable vessel(s) in any suitable manners, for containing and/or delivering gaseous feedstock(s), without converting feedstock source(s) into gaseous feedstock(s). For example, vessel 1 may be replaced by a bottle or other chamber containing preformed gaseous feedstock, or vessel 1 may be replaced by conduit means (e.g. pipework) constituting at least one vessel for supplying gaseous feedstock(s) from elsewhere, e.g. from a separate source of gaseous feedstock (s).

The present invention includes equivalents and modifications arising from all the disclosures of the present specification, e.g. from the description given before the first reference to the accompanying drawings, and also the disclosures of the drawings. The apparatus shown in the drawings may provide any corresponding dissociation product(s), e.g. gaseous $P_4$ may provide gaseous $P_2$ by utilising thermal cracking, or gaseous $P_4$ may provide gaseous $P_2$ and/or gaseous $P_1$ by utilising electrical cracking. Gaseous $P_4$ may be provided by heating solid red phosphorus $P_4$ in vessel 1.

HERAEUS HSQ400 and Corning Code 7940 mentioned earlier above are believed to be quartzes that are purer than at at least 99.9999% $SiO_2$.

The wording of the claims and abstract appended to this specification should be deemed as imported into the above description.

I claim:

1. Cracker apparatus, comprising:
   (a) a feedstock vessel for providing at least one gaseous crackable substance, said vessel comprising an inert surface for contacting said gaseous crackable substance;
   (b) dispenser means for receiving said gaseous crackable substance from said feedstock vessel, said dispenser means comprising inert surface for contacting said gaseous crackable substance;

(c) cracker means for receiving said dispensed gaseous crackable substance from said dispenser means, said cracker means comprising an inert surface for contacting said dispensed gaseous crackable substance;

(d) pipework for detachably coupling said feedstock vessel to said dispenser means, said feedstock vessel being detachably coupled to said pipework by means of a ball-and-socket joint, and said pipework being detachably coupled to said dispenser means by means of a cone-and-socket joint, said pipework and said joints comprising inert surfaces for contacting said gaseous crackable substance;

(e) wherein: said dispenser means comprises a dispenser valve comprising a tapered valve stem and a taper-matched valve seat within which is fitted said valve stem, said valve stem comprising an inert surface for contacting said gaseous crackable substance, said valve seat comprising inert surface for contacting said gaseous crackable substance;

(f) said dispenser valve comprises a valve base and a valve top, said valve base comprising a channel for receiving said gaseous crackable substance from said pipework, said received gaseous crackable substance then passing across an arcuate channel in the upper face of said valve base and the co-joined face of said valve top, said arcuate channel terminating over a hole in said valve seat, said gaseous crackable substance being able to flow from said arcuate channel into a longitudinal cavity in said valve base, and thence via a diagonal channel to a longitudinal channel in the upper face of said valve base and the co-joined face of said valve top, said longitudinal channel being connected to an axially located channel in said valve top so as to allow passage of said gaseous crackable substance into said cracker means, said valve base comprising an inert surface for contacting said gaseous crackable substance, said valve top comprising an inert surface for contacting said gaseous crackable substance.

2. Cracker apparatus as claims in claim 1, wherein at least one said inert surface at least partly comprises quartz.

3. Cracker apparatus as claimed in claim 1, comprising an air-tight housing for said feedstock vessel, the outer surface of said housing being water-coolable.

4. Cracker apparatus as claimed in claim 1, wherein said pipework comprises a sump zone, the said sump zone comprising inert surface for contacting said gaseous crackable substance.

5. Cracker apparatus as claimed in claim 1, comprising transducer means for actuating said dispenser means.

6. Cracker apparatus as claimed in claim 5, wherein said transducer means comprises micrometer linear transducer means.

7. Cracker apparatus as claimed in claim 5, wherein said transducer means comprises a computer controlled transducer that will be operated in accordance with a computer program.

8. Cracker apparatus as claimed in claim 5, wherein said valve stem is actuated by means of a connecting shaft connected by means of a spring to a said transducer means, said spring controlling the maximum closing force that can be applied to said valve stem.

9. Cracker apparatus as claimed in claim 1, wherein said axially located channel of said dispenser valve is tapered to accept a conical base of a cracker pot.

10. Cracker apparatus as claimed in claim 1, wherein said cracker means is detachably coupled to said dispenser means by means of a cone-and-socket joint.

11. Cracker apparatus as claimed in claim 1, wherein said cracker means comprises thermal cracking means.

12. Cracker apparatus as claimed in claim 1, wherein said cracker means comprises electrical cracking means.

13. Cracker apparatus as claimed in claim 1, comprising at least one heater means for heating at least one portion of said cracker apparatus.

* * * * *